United States Patent [19]

Noé

[11] Patent Number: 5,169,051
[45] Date of Patent: Dec. 8, 1992

[54] STRIP WELDING MACHINE

[75] Inventor: Oskar Noé, Mülheim, Fed. Rep. of Germany

[73] Assignee: BWG Bergwerk-und Walzwerk Maschinenbau GmbH, Duisberg, Fed. Rep. of Germany

[21] Appl. No.: 810,206

[22] Filed: Dec. 19, 1991

[30] Foreign Application Priority Data

Jan. 8, 1991 [DE] Fed. Rep. of Germany ....... 4100302

[51] Int. Cl.$^5$ ........................................... B23K 37/047
[52] U.S. Cl. .................... 228/5.7; 228/49.1; 228/56.5
[58] Field of Search ............... 228/5.7, 5.1, 9, 49.1, 228/56.5

[56] References Cited

U.S. PATENT DOCUMENTS 3,191,843 6/1965 Tompkins ............................ 228/5.7

FOREIGN PATENT DOCUMENTS 2642583 3/1977 Fed. Rep. of Germany ....... 228/5.7
1187941 10/1985 U.S.S.R. .............................. 228/49.1

Primary Examiner—Richard K. Seidel
Assistant Examiner—Jeffrey T. Knapp
Attorney, Agent, or Firm—Anderson Kill Olick & Oshinsky

[57] ABSTRACT

A strip welding machine for welding abutting cut surfaces at a strip beginning and at a strip end of metal strips. Cutting tools are provided for producing the cut surfaces. A welding apparatus is used for welding the cut surfaces. A cutting stop which can be raised above the plane of the strip is arranged in front of the cutting tool on the entry side and a measuring drive operating in strip travel direction is arranged in front of one of the strips. A cutting stop which can be raised above the plane of the strip is arranged following the cutting tool on the exit side also in strip travel direction and a measuring drive operating against the strip travel direction is arranged following the other of the strips. The measuring drives ensure that the respective strips are exactly positioned initially in cutting position and subsequently in welding position.

8 Claims, 2 Drawing Sheets

STRIP WELDING MACHINE

BACKGROUND OF THE INVENTION

1. Field of the Invention

The present invention relates to a strip welding machine for welding cut surfaces, particularly abutting cut surfaces, at a strip beginning and a strip end of metal strips to be connected. The strip welding machine includes separately arranged cutting tools for producing the cut surfaces and a welding apparatus arranged between the cutting tools. The welding apparatus includes a welding table arranged underneath the welding apparatus. The welding table has a guide gap for a welding stop member for the respective strip ends and/or the respective strip beginning, wherein the welding stop member can be raised in the guide gap above the plane of the welding table.

2. Description of the Related Art

Strip welding machines of the above-described type are preferably used in continuously operating strip processing lines. This is because, in such strip processing lines, after a coil has traveled through, the strip end thereof and the strip beginning of a new coil must be connected to each other. In the known strip welding machines, this is preferably done by means of laser welding. Laser welding is intended to prevent the formation of projections or thickened portions in order to ensure the planeness of the metal strips even in the area of the connecting seam. However, laser welding works only if the cut surfaces are exactly positioned relative to each other. Moreover, such an exact positioning of the cut surfaces relative to each other is also required in other welding processes.

SUMMARY OF THE INVENTION

Therefore, it is the object of the present invention to provide a strip welding machine of the above-described type in which the strip beginning and the strip end of the strip to be connected can be exactly positioned relative to the cutting devices and in which the cut surfaces produced in the cutting devices can be positioned exactly relative to the welding apparatus.

In accordance with the present invention, in a strip welding machine of the above-described type, a cutting stop Which can be raised above the plane of the strip is arranged in front of the cutting tool on the entry side in strip travel direction and a measuring drive operating in strip travel direction is arranged in front of one of the strips, and a cutting stop which can be raised above the plane of the strip is arranged following the cutting tool on the exit side in strip travel direction and a measuring drive operating against the strip travel direction in arranged following the other strip.

The invention starts from the finding that the strip ends of metal strips top be connected during welding must be positioned exactly in the region of the welding apparatus. This exact positioning is made possible within the scope of the invention by means of the two measuring drives to the left and to the right of the connecting or welding points. The measuring drive simultaneously serves to position the respective strip ends in the region of the cutting tools. For this purpose, the respective strip ends are moved by means of the measuring drive against the cutting stops which have been raised. After the cut has been carried out, the strip end on the exit side is moved by the measuring drive on the exit side to the welding stop which represents the middle of the connecting or welding point. The force with which the strip end is moved against the cutting stop is adjustable as desired. Subsequently, the respective strip end is clamped onto the welding table and the welding stop is lowered. The strip end on the entry side is then moved against the abutting edge of the strip end on the exit side with an adjustable force. Subsequently, the welding procedure can be carried out.

In order to safely eliminate any deformation, such as, rolling effects, on the strip ends of the two metal strips to be connected, an additional feature according to the present invention of independent significance provides that each measuring device has an upper roller, for example, steel roller, with a coating which is hard with respect to strength, and a lower roller with an elastically yielding coating. The coating of the upper roller has a defined granulation, for example, 5 $\mu m$ to 15 $\mu m$, of tungsten carbide. The lower roller advantageously has an elastically yielding coating of rubber or plastic material. The lower roller acts as a friction roller.

The upper rollers of the measuring drive are used for measuring distances for determining the adjusting speed and adjusting force. The measuring drives are driven by servo-motors which make possible a very fine adjustment. Moreover, lateral centering devices for the respective strip can be arranged in front of and following the measuring drives, respectively.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DESCRIPTION OF THE PREFERRED EMBODIMENT

Figure 1:
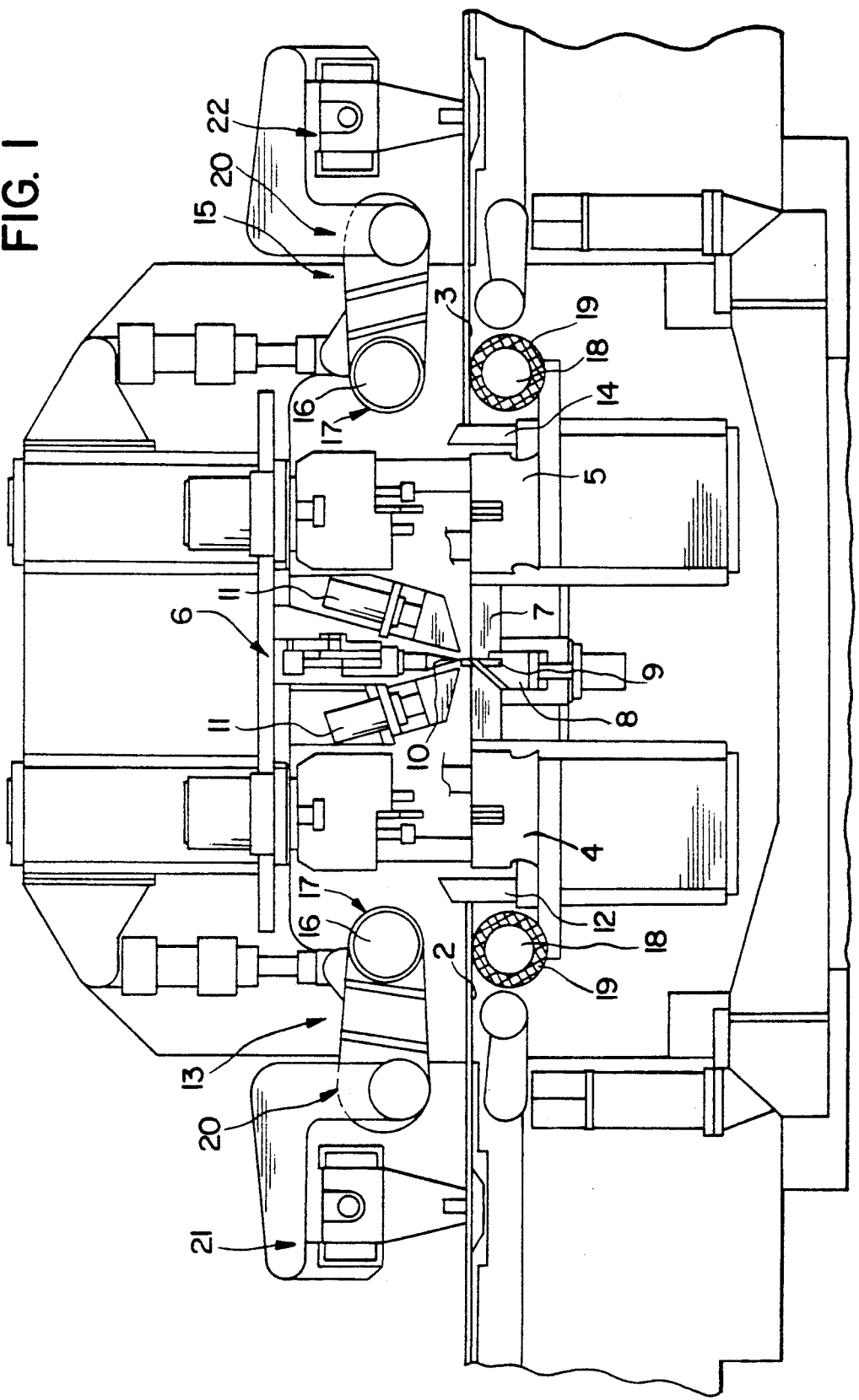
FIG. 1 is a schematic side view of a strip welding machine according to the present invention with open measuring drive.
Figure 2:
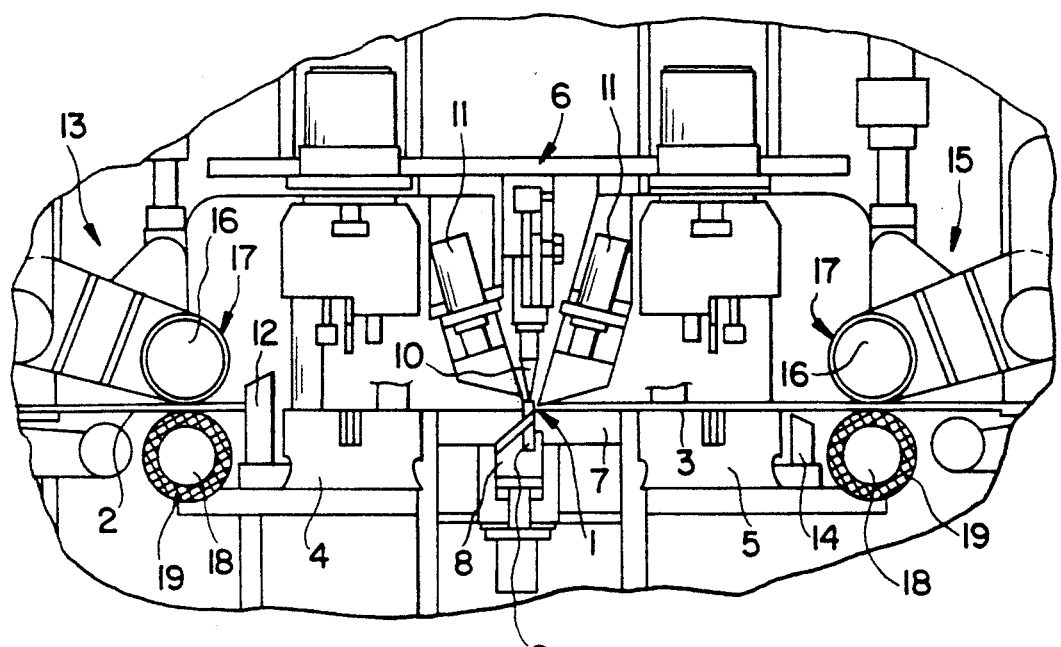
FIG. 2 is a schematic view of a detail of the strip welding machine of FIG. 1 with closed measuring drives and a strip end on the exit side moves against the welding stop.
Figure 3:
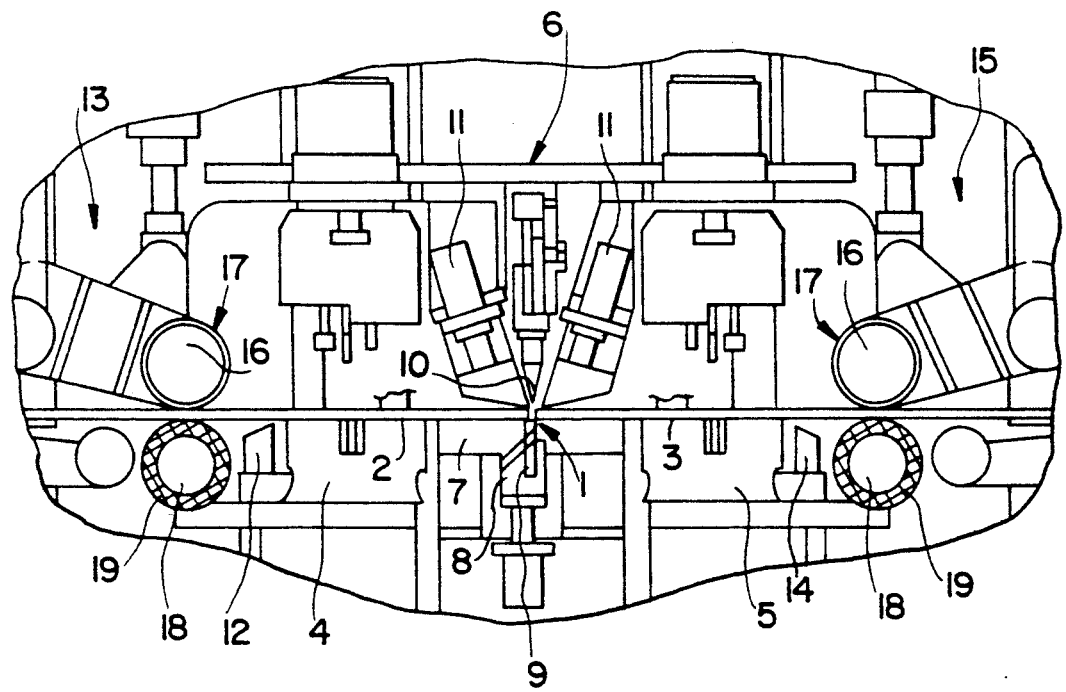
FIG. 3 is a schematic view of a detail of the strip welding machine of FIG. 1 with the strip ends being in welding position.

The figures of the drawing show a strip welding machine for welding cut surfaces, particularly abutting cut surfaces 1, of a strip beginning 2 and a strip end 3 of metal strips to be connected.

The strip welding machine includes separately arranged cutting tools 4, 5 for producing the cut surfaces 1 and a welding apparatus 6 arranged between the cutting tools 4, 5. The welding apparatus 6 is preferably a laser welding apparatus. A welding table 7 is arranged underneath the welding apparatus 6. The welding table 7 has a guide gap 8 for a welding stop 9 for the respective strip ends or the respective strip beginning. The welding stop 9 can be raised above the plane of the table and can be lowered in the guide gap 8. The welding apparatus 6 additionally includes a schematically indicated welding head 10 and welding clamps 11 which can be lowered on both sides toward the welding table 7. The two separately arranged cutting tools 4, 5 each have two lower knives and an upper knife which can be moved virtually without leaving a gap between the two lower knives. A cutting stop 12 which can be raised above the plane of the strip is arranged in front of the cutting tool 4 on the entry side in strip travel direction. A measuring drive 13 operating in strip travel direction is arranged in front of one of the strips. A cutting stop 14 which can be raised above the plane of the strip is arranged following the cutting tool 5 on the exit side in strip travel direction. A measuring drive 15 operating against strip travel direction is arranged following the other strip.

Each measuring drive 13, 15 has an upper roller 16, for example, a steel roller, with a hard coating 17, for example, a plasma coating of tungsten carbide. Each measuring drive 13, 15 further includes a lower roller 18 with an elastically yielding coating 19. The upper roller 16 is driven and the lower roller 18 operates as a friction roller. The coating 17 of the upper roller 16 has a defined granulation of, for example, 5 μm to 15 μm. The lower roller 18 has an elastically yielding coating 19 of rubber or plastics material.

The measuring drives 13, 15 are driven by servomotors 20. In addition, as schematically indicated, the measuring drives 13, 15 include lateral centering devices 21, 22 arranged in front of or following the respective strip.

The measuring devices 13, 15 ensure an exact positioning of the respective strip ends 2, 3 initially in the cutting position and subsequently in the welding position thereof.

While a specific embodiment of the invention has been shown and described in detail to illustrate the application of the inventive principles, it will be understood that the invention may be embodied otherwise without departing from such principles.

I claim:

1. In a strip welding machine for welding cut surfaces of a strip beginning and a strip end of metal strips to be connected, the strip welding machine including separately arranged cutting tools for producing the cut surfaces and a welding apparatus arranged between the cutting tools, the welding apparatus including a welding table arranged underneath the welding apparatus, the welding table including a guide gap for a welding stop for the respective strip end or the respective strip beginning, wherein the welding stop can be raised in the guide gap above the plane of the table, the improvement comprising a cutting stop, which can be raised above the plane of the strip, said cutting stop being arranged in front of the cutting tool on an entry side in strip travel direction and a measuring drive operating in strip travel direction being arranged in front of one of the strips, and a cutting stop, which can be raised above the plane of the strip, said cutting stop being arranged following the cutting tool on an exit side in strip travel direction and a measuring drive operating against strip travel direction being arranged following the other of the strips.

2. The strip welding machine according to claim 1, wherein each measuring drive comprises an upper roller with a hard coating and lower roller with an elastically yielding coating.

3. The strip welding machine according to claim 2, wherein the upper roller is a steel roller.

4. The strip welding machine according to claim 2, wherein the hard coating is of tungsten carbide.

5. The strip welding machine according to claim 2, wherein the coating of the upper roller has a defined granulation of 5 μm to 15 μm.

6. The strip welding machine according to claim 2, wherein the lower roller has a coating of rubber or plastic material.

7. The strip welding machine according to claim 1, wherein the measuring drives are driven by servomotors.

8. The strip welding machine according to claim 1, wherein lateral centering devices for the respective strip are arranged in front of and following the measuring drives.

* * * * *